(12) United States Patent
Wittler (10) Patent No.: US 9,010,111 B2
(45) Date of Patent: Apr. 21, 2015

(54) COMPRESSOR COMPRISING A SWIRL GENERATOR, FOR A MOTOR VEHICLE

(75) Inventor: Michael Wittler, Bad Wunnenberg (DE)

(73) Assignee: FEV GmbH, Aachen (DE)

( * ) Notice: Subject to any disclaimer, the term of this patent is extended or adjusted under 35 U.S.C. 154(b) by 241 days.

(21) Appl. No.: 13/265,954

(22) PCT Filed: Apr. 29, 2009

(86) PCT No.: PCT/EP2009/003101
§ 371 (c)(1),
(2), (4) Date: Oct. 24, 2011

(87) PCT Pub. No.: WO2010/124701
PCT Pub. Date: Nov. 4, 2010

(65) Prior Publication Data
US 2012/0037133 A1 Feb. 16, 2012

(51) Int. Cl.
*F02B 33/44* (2006.01)
*F02B 25/14* (2006.01)
*F02D 13/02* (2006.01)
(Continued)

(52) U.S. Cl.
CPC ............... *F02B 25/145* (2013.01); *F02B 33/34* (2013.01); *F02B 33/44* (2013.01); *F02B 37/013* (2013.01); *F02B 37/04* (2013.01); *F02B 39/04* (2013.01); *F02B 39/10* (2013.01); *F02D 13/0261* (2013.01); *F02M 25/0709* (2013.01);
(Continued)

(58) Field of Classification Search
CPC ........ F02B 25/145; F02B 33/44; F02B 31/04; F02B 37/013; F02D 13/0261; F02M 29/06; F02M 25/0711; Y02T 10/18; Y02T 10/144

USPC ............ 123/562, 559.1, 306, 568.17; 60/602, 60/605.1, 605.2; 415/183, 191
See application file for complete search history.

(56) References Cited

U.S. PATENT DOCUMENTS 3,723,021 A * 3/1973 Bartholomew ............... 415/147
4,375,939 A * 3/1983 Mount et al. .................. 415/157
(Continued)

FOREIGN PATENT DOCUMENTS

DE 19616555 A1 11/1996
DE 102004023590 A1 12/2005
(Continued)

*Primary Examiner* — Thai Ba Trieu
*Assistant Examiner* — Jason T Newton
(74) *Attorney, Agent, or Firm* — Gifford, Krass, Sprinkle, Anderson & Citkowski, P.C.

(57) ABSTRACT

The invention relates to the operation of a supercharged internal combustion engine (2) of a vehicle, wherein an air/volumetric flow current is adjusted by means of an adjustable swirl generator (8) arranged upstream of a supercharge system, taking into consideration an adjustable valve overlap of a cylinder of the internal combustion engine (2). The invention also relates to a vehicle drive comprising a supercharged internal combustion engine (2), a supercharge system of the internal combustion engine (2), an adjustable, variable valve train of the internal combustion engine (2), a control device and an adjustable swirl generator (8). Said swirl generator (8) is arranged upstream of a supercharge unit of the supercharge system, the control device is connected to the swirl generator (8) and to the variable valve train and has a control which correlates a setting of the variable valve train with a setting of the swirl generator (8) to produce a valve overlap for rinsing a combustion chamber of a cylinder of the internal combustion engine (2).

20 Claims, 2 Drawing Sheets

(51) Int. Cl.
  *F02M 29/06* (2006.01)
  *F02B 33/34* (2006.01)
  *F02B 37/013* (2006.01)
  *F02B 37/04* (2006.01)
  *F02B 39/04* (2006.01)
  *F02B 39/10* (2006.01)
  *F02M 25/07* (2006.01)

(52) U.S. Cl.
  CPC ....... *F02M 25/0711* (2013.01); *F02M 25/0727* (2013.01); *F02M 29/06* (2013.01); *Y02T 10/18* (2013.01)

(56) References Cited

U.S. PATENT DOCUMENTS

| | | | | |
|---|---|---|---|---|
| 4,428,334 | A * | 1/1984 | Klomp | 123/188.14 |
| 5,662,079 | A * | 9/1997 | Snider | 123/188.14 |
| 7,533,657 | B2 | 5/2009 | Onodera | |
| 7,641,720 | B2 * | 1/2010 | Li | 96/108 |
| 7,730,874 | B2 | 6/2010 | Leduc et al. | |
| 7,909,035 | B2 | 3/2011 | Thornton | |
| 8,286,428 | B2 * | 10/2012 | Capon et al. | 60/605.1 |
| 8,651,800 | B2 * | 2/2014 | Li | 415/71 |
| 2003/0226539 | A1 * | 12/2003 | Kim | 123/306 |
| 2004/0096316 | A1 * | 5/2004 | Simon et al. | 415/151 |
| 2004/0197187 | A1 * | 10/2004 | Usab et al. | 415/1 |
| 2005/0002782 | A1 * | 1/2005 | Nikpour et al. | 415/208.1 |
| 2005/0011488 | A1 * | 1/2005 | Doucet | 123/306 |
| 2006/0042588 | A1 * | 3/2006 | Kindl et al. | 123/306 |
| 2006/0156723 | A1 * | 7/2006 | Tonetti et al. | 60/600 |
| 2006/0213193 | A1 * | 9/2006 | Koopmans | 60/602 |
| 2007/0119425 | A1 | 5/2007 | Lewis et al. | |
| 2007/0234985 | A1 * | 10/2007 | Kolmanovsky | 123/90.15 |
| 2007/0256653 | A1 | 11/2007 | Budack et al. | |
| 2008/0077304 | A1 * | 3/2008 | Suzuki et al. | 701/102 |
| 2008/0127644 | A1 * | 6/2008 | Codan et al. | 60/600 |
| 2009/0301085 | A1 * | 12/2009 | Heyes | 60/611 |
| 2009/0324392 | A1 * | 12/2009 | Fleischer et al. | 415/147 |
| 2010/0205949 | A1 * | 8/2010 | Bolda et al. | 60/309 |
| 2011/0011084 | A1 * | 1/2011 | Yanagida et al. | 60/605.2 |

FOREIGN PATENT DOCUMENTS

| | | | | |
|---|---|---|---|---|
| DE | 102005045194 A1 | 4/2007 | | |
| DE | 112005001946 T5 | 5/2007 | | |
| DE | 102005045193 A1 | 12/2007 | | |
| EP | 1705358 A1 | 9/2006 | | |
| EP | 2163746 A2 * | 3/2010 | | |
| FR | 2781011 A1 | 1/2000 | | |
| WO | WO 2004/011787 A1 * | 2/2004 | | F02B 69/06 |
| WO | WO 2008/129076 A1 * | 10/2008 | | F02M 45/16 |

* cited by examiner

COMPRESSOR COMPRISING A SWIRL GENERATOR, FOR A MOTOR VEHICLE

CROSS-REFERENCE TO RELATED APPLICATIONS

This application is claims priority to International Patent Application PCT/EP2009/003101 filed Apr. 29, 2009, which is incorporated herein in its entirety by reference.

FIELD OF THE INVENTION

The present invention relates to a vehicle drive for an internal combustion engine with supercharging, a method for operating a supercharged internal combustion engine of a motor vehicle and an application of a swirl generator in an internal combustion engine.

BACKGROUND OF THE INVENTION

Providing supercharging is a known method for obtaining an increase of pressure in the intake air flow for internal combustion engines in motor vehicles. Supercharging is provided particularly for internal combustion engines operating on the diesel principle in order to increase an achievable torque. The torque in this case is proportional to the air charge. A wide variety of types of supercharging are accordingly considered prior art for internal combustion engines operating on the diesel principle, but also for those based on the spark-engine principle. These include manual superchargers such as the Comprex supercharger, exhaust gas turbochargers, supercharging by means of dynamic systems such as ram-type supercharging, resonance supercharging, variable intake pipe systems, or Roots-type superchargers, rotary vane superchargers, spiral-type superchargers or screw-type superchargers. They can also be combined for use in the internal combustion engine. Providing a single-stage or dual-stage supercharging method is also known for achieving an improved air charge.

The problem of the present invention is to provide an improvement of an air charge for supercharged direct-injection internal combustion motor vehicle engines.

SUMMARY OF THE INVENTION

This problem is solved with an operation of a supercharged internal combustion engine with the characteristics of claim 1, as well as a vehicle drive with the characteristics of claim 10 and a use with the characteristics of claim 20. Additional advantageous embodiments and improvements are specified in the respective subordinate claims. The individual features following from the description below of individual configurations are not to be interpreted restrictively, but can be combined with features from other configurations into refinements, without these being described here in detail.

An operation of a supercharged internal combustion engine for a vehicle is proposed in which an air/volumetric flow current is adjusted by means of an adjustable swirl generator arranged upstream of a supercharging unit, taking into account an adjustable valve overlap of a cylinder in the internal combustion engine. Such an operation makes use of the possibility of supplying the energy generated as an angular momentum by the swirl generator to, for example, a compressor of the supercharging unit, so that thereby the energy can be converted to a higher rotational speed of the exhaust gas turbocharger. In this manner energy is not simply lost in case of a throttling of an air/volumetric flow, but instead an energy conversion and thus a reduction of a throttle loss becomes possible due to the generation of an angular momentum. This is coupled with a variable valve timing, which is preferably made possible by means of an adjustable valve overlap. Thereby fresh air can flow from an intake to an exhaust side of the internal combustion engine through a combustion chamber of the cylinder of the internal combustion engine and generate a scavenging, whereby a stationary torque or a torque in general can be dynamically built up more quickly and also increased. From the combination of the two possibilities, a faster charge pressure buildup for the internal combustion engine can be achieved with a simultaneously improved scavenging and thus a higher torque overall.

An adjustment of the swirl generator is adapted, for example, to a scavenging process of the cylinder. In this way, a throttle effect of the swirl generator can be adapted by appropriate adjustment and or a swirl generation of the swirl generator. It is preferred if a control of an adjustment of the swirl generator and the valve overlap as a function of one another is used to influence a charging of the cylinder. For example, an appropriate program for this purpose can be provided in an electronic engine control device, by means of which such a control can be executed. The controller can preferably be designed such that a higher charge pressure for the supercharging can be produced by an adjustment of the swirl generator and a more rapid scavenging in the cylinder can be generated by an adapted adjustment of the valve overlap. This means, for example, that the period for the valve overlap could also be reduced.

It is preferred according to one configuration, for example, that a load control of the internal combustion engine be carried out via the swirl generator. It can even be provided, for example, that the load control the performed exclusively via the swirl generator over an operating range. There further exists the possibility of not installing a throttle valve in the internal combustion engine, so that the load control is substantially performed exclusively via the swirl generator and the variable valve timing. The proposed operation is preferably used in an operating range of the internal combustion engine that is at least close to full load. According to one refinement there is also the possibility of using the proposed operation for reducing a knock sensitivity of the internal combustion engine. In this regard it is possible to take the fuel currently used into consideration, for which a fuel sensor can be used, for example.

In addition, a vehicle drive is proposed, comprising a supercharged internal combustion engine, a supercharging of the internal combustion engine, an adjustable variable valve train of the internal combustion engine, a control device and an adjustable swirl generator, wherein the swirl generator is arranged upstream of a charging unit for supercharging and the control device is connected to the swirl generator and the variable valve train and has a controller that correlates an adjustment of the variable valve train with an adjustment of the swirl generator in order to produce a valve overlap for scavenging a combustion chamber of a cylinder of the internal combustion engine. Correlation is to be understood in the broadest sense as a connection of the two adjustments with one another. An adjustment can be stored in a characteristic diagram or correspondingly calculated. There further exists the possibility of undertaking a correlation between the adjustment of the variable valve train and an adjustment of the swirl generator via one or more models as well as via corresponding numerical methods or direct calculation from mathematical formulas. The correlation can be undertaken either directly or indirectly, in which case one or more additional parameters of influence can be taken into account using an engine control device. For example, a crankshaft speed, a pressure in an intake pipe, a mass flow, a temperature and/or an indication of the fuel being used can enter into the correlation. The following can also influence an adjustment of the swirl generator: information with respect to the associated supercharging unit or the supercharging itself, a load request, a state of the internal combustion engine, a dependency with respect to emissions, an injection time point of a fuel and/or an injection curve of a fuel. Information with respect to supercharging can be information relating to a guide vane position or, in particular, a guide vane position adjustment, but also information with respect to a rotation of a compressor and/or a pressure upstream or downstream of the compressor. The engine control device is capable of controlling at least an adjustment of a swirl generator as well as a valve overlap, or even regulating one or both, which can be adapted using a wide variety of target specifications. Possible target specifications, for example, are a generation of a rapid torque via a more rapid scavenging for example, as well as by generating a higher pressure in the combustion chamber and therefore a faster startup of a compressor due to appropriate swirl application, influencing an emission of the internal combustion engine as a function of, for example, a state of an exhaust treatment device, a load state or an operating requirement placed on the internal combustion engine. However, there can also be other target specifications placed on the engine control device, which can also be coupled to one another.

It is further proposed that a controller of the control device use the swirl generator to adjust an air/volumetric flow. Thus the swirl generator can serve as a throttle, for example. There is the possibility that the swirl generator supports a different throttle present in an air path or even is arranged in an air path as the only adjustable throttle. There is also the possibility that the control device comprises a stored load controller using the swirl generator. This utilizes the function of the swirl generator as a throttle but also the function of increasing a charging level. Another configuration provides that the internal combustion engine is not equipped with any throttle valve, in which case the control device adjusts the swirl generator to control an air/volumetric flow into a combustion chamber of a cylinder in the internal combustion engine. This is preferably performed in combination with an adjustment of the variable valve train for a load regulation.

Another configuration provides a throttle valve, in which case the setting of the throttle valve and the setting of the swirl generator are correlated with one another. This correlation can be stored in the control device. For example, a throttle valve can be arranged for this purpose upstream of the swirl generator, as viewed in the direction of flow. On the other hand, another configuration provides for a throttle valve to be arranged downstream of a charging unit in the direction of flow and preferably downstream of a swirl generator. There also exists the possibility that the swirl generator is adjustable to apply a swirl in a rotational direction of a compressor device in the supercharger unit to a flow, as well as being adjustable to apply a swirl opposite to a rotational direction of a compression unit in the supercharging process to the flow. In this manner, a charge of a combustion chamber can be increased but also reduced, if desired. An adjustment of the geometry of the swirl generator also makes it possible to avoid a blow-off of compressed air in the air path, since the swirl generator can be used as the throttle to support the compressor unit at certain operating points, for example.

For the sake of example, but without limitation, additional preferred details will be described based on a motor vehicle drive and a method for operating a motor vehicle as follows, but without limiting the respective features to this specific drive or the respective element described there. Rather, the drive can comprise an internal combustion engine operating on the spark-ignition and/or diesel principle, with a direct injection as well as without a direct injection, a homogeneous method as the combustion method, a precombustion chamber for mixture formation, as well as a wide variety of other combustion methods, mixture formations and corresponding internal combustion engines.

As a refinement, for example, a vehicle drive can be described that comprises a direct injecting, supercharged internal combustion engine, a valve train of the internal combustion engine with preferably variably adjustable valves, and a swirl generator arranged upstream of the internal combustion engine that applies a swirl to an airflow supplying the internal combustion engine, wherein the swirl generator comprises an adjustment unit for achieving a variably strong swirl. The drive additionally comprises a control device that is connected to the swirl generator and the valve train, wherein the control device comprises a stored correlation between at least one applied swirl and a valve overlap of at least one intake valve and at least one exhaust valve of the valve train on at least one cylinder of the internal combustion engine.

The valve train of the internal combustion engine with preferably variably adjustable valves can have an electromagnetic actuation of the valves. However, it can also be implemented mechanically, hydraulically or by a connection of various actuation possibilities for different valves. For example, a cam adjustment can be provided that acts on a part of the intake or exhaust valves. A fully variable valve train can also be provided. The valve train is preferably capable of actuating intake and exhaust valves associated with a cylinder of the internal combustion engine independently of one another. For example, it is provided that each individual valve associated with a cylinder can be variably adjusted with respect to its opening and closing time. Another configuration provides that only one valve, for example an intake or exhaust valve, has variable timing. In this manner a valve overlap of the intake and exhaust valve can be adjusted; in particular, this can be done via a regulation or control. One example embodiment of a modification of valve opening and/or valve closing times as well as a corresponding device is found in DE 103 467 47 A1, herewith incorporated in full into the disclosure by reference. The adjustment of valve opening and closing times can preferably used at least in cooperation with the swirl generator for load regulation.

The swirl generator arranged upstream of the internal combustion engine, as viewed in the direction of flow, is preferably likewise arranged upstream of the supercharger upstream of the internal combustion engine. The swirl generator is capable, for example, of applying a rotational flow to a flow supplying the internal combustion engine. In this manner a swirl is preferably transferred into a supercharging device to be employed, possibly even utilized there to amplify a pressure build-up, based on the supercharging technology in use. Possibilities to be considered for supercharging are described above in the prior art section, which are hereby incorporated by reference. The swirl generator is preferably coupled to a flow compressor. The swirl generator makes it possible to apply a flow to the rotor blades of the compressor differently than without a swirl generator. If the swirl generator is specifically adjusted as a function of at least one operating parameter such as a mass flow, a flow velocity or load, a load point or a target load, the swirl generation can effect a flow impingement on the rotor blades with a speed component amplifying the compression. This results in a faster response of the compressor as well as a higher compression, whereby an air charge with a higher fresh gas flow and thus a higher degree of scavenging as well become possible. The compressor can be coupled to an exhaust gas turbine. The compressor can also be arranged alone in the intake pipe to the internal combustion engine, but without an exhaust gas turbine, as a mechanically or electromagnetically driven compressor, for example.

For multistage supercharging, the swirl generator can also be arranged between a low-pressure supercharger and high-pressure supercharger, for example. Two or more swirl generators can also be arranged upstream of the internal combustion engine. In particular, a swirl generator can be provided that is upstream of a supercharger, for example. A reduction of a channel cross-section can be additionally provided in the intake channel of the internal combustion engine, by means of a turbulence generation device, for example. It must be noted in regard to the invention that such a generation device is not to be understood as a swirl generator of the present invention. Instead, the swirl generator is arranged outside the cylinder head, i.e. separately from the internal combustion engine and preferably along an air path upstream of the supercharger in the form of a compressor or the like or integrated therein.

Configuration examples of various possibilities for supercharging in which one or more swirl generators are provided follow from, for example, DE 10 2006 026 166 A1, DE 10 2006 011 862 A1, DE 10 2005 045 194 A1, DE 10 2004 039 299 A1 and WO 2007135 089 A1. The latter are hereby incorporated in full by reference into the disclosure with respect to the design of the supercharging on the one hand and of the swirl generator on the other, as well as in regard to the arrangement of the swirl generator. The same also applies to the operating mode of the swirl generator as follows from the respective publications. According to one configuration, the swirl generator can be designed preferably in the form of a guide vane adjustment in connection with a compressor, wherein the guide vanes are preferably simultaneously and jointly variable in their respective position via an actuation device. Another configuration provides that the swirl generator does not comprise any guide vanes but rather uses a compressor. The swirl generator is preferably designed in the manner that follows from the above specified publications. Another configuration provides, for example, that a swirl generator is arranged upstream of a guide vane apparatus as viewed in the direction of flow. According to one refinement, the guide vane apparatus can comprise one or more adjustable guide vanes. A low-pressure and a high-pressure compression is referred to in DE 10 2006 027 738 A1, for example. The latter also discloses that an exhaust gas turbine as well as a compound turbine downstream thereof are provided in the exhaust tract. The swirl can be created by the swirl generator upstream of the low-pressure compressor and/or the high-pressure compressor. This publication is likewise incorporated in full into the disclosure by reference.

The correlation that is stored in the control device and according to which a swirl application takes place can comprise a directly implemented magnitude of the swirl, for example. A characteristic diagram or a mathematical relationship, for example, can be stored for this purpose. The swirl can also enter indirectly into the correlation, for example, by linking the position of the swirl generator to a mass flow through the swirl generator. It is also possible to use other parameters via which the swirl can enter indirectly into the correlation, such as a load point, a rotational speed of the crankshaft, a rotational speed of a charger, particularly a compressor, a speed of an intake mass airflow and/or a target load. A temperature-dependent component can also enter into the correlation as well as a pressure-dependent component. The same applies to a density-dependent component, relative in each case to the mass flow passing through the swirl generator. The valve overlap can be directly stored in the control device absolutely, as a time or time period, distributed to individual valves, and indirectly in the form, for example, of control times, control periods or opening and closing times, which are detected and/or specified by the control device as target and actual values. The control device can be a valve train control device connected to an engine control device, for example. The control device can also be the engine control device itself.

An internal and/or external exhaust gas recirculation can also be provided. A single exhaust gas recirculation can be provided, for example. However, an exhaust gas recirculation into a high-pressure section and a low-pressure section can also be provided. It can also be provided that hot exhaust gas is recirculated upstream of the supercharger as viewed in the direction of flow, and therefore the mixture of the intake air stream and the supplied exhaust gas stream is guided not only through the supercharger, but also through the swirl generator itself. If the exhaust gas is mixed with an intake air stream, the temperature increases. This implies that the swirl generator is correspondingly temperature-resistant. The swirl generator can consist at least partly of high-temperature resistant plastic, for example. It can also consist completely thereof. Another configuration provides that the swirl generator comprises metal components at least in part, preferably made of stainless steel. Another configuration provides that a light metal is used, such as light metal alloys of the type familiar from valve construction, cylinder head construction or the like.

The swirl generator can preferably be adjusted by means of an actuator. The actuator is capable of moving the adjustment device for the swirl generator in a guided manner, so that a specific positioning that can be specified is occupied. In this manner it becomes possible to set a position of the swirl generator adapted to the respective operating point of the internal combustion engine in particular, and additionally to adapt this position immediately to changes that abruptly occur. For example, a monitoring unit that monitors at least a swirl generation and a valve overlap is provided for this purpose in the drive. The swirl generation can be detected by setting a valve overlap adapted to an operating point of the internal combustion engine or a load for example. A flow velocity is then inferred from the operating point. From a mass flow sensor, it is also possible to infer a speed present at the swirl generator or generated thereby, and based thereon, to adjust or override a setting of the adjustment by the associated actuator. A pressure sensor, arranged downstream of the supercharger for example, can also be used for this purpose. Via a characteristic diagram, for example, it is then possible to infer a swirl that will be or is applied to this air stream and, with an appropriate brief delay then adjusts or effects a scavenging of the cylinder's combustion chamber during the overlap of the intake and exhaust valve of the associated valve train. The monitoring unit can be integrated into an engine control device, for example. It is also possible for the monitoring unit to be divided. For example, one part thereof can be present in the control device associated with the swirl generator, while another part of the monitoring unit is integrated into a control device that is associated with the valve train. In addition, it is possible for the control device, in the form of the engine control device connected to the swirl generator and the valve, to comprise the integrated monitoring unit.

There is the further possibility that the valve overlap of the intake and exhaust valve or valves of the valve train can be adjusted not only relative to the respective load point, but also relative to the applied swirl. According to one refinement, this can take pace in connection with an exhaust gas cleaning arranged downstream of the internal combustion engine and/or in the exhaust gas recirculation channel. Due to the applied swirl, it is possible to achieve an improved scavenging during the valve overlap. For example, one refinement offers the possibility that nitrogen oxide emissions can be reduced thereby. Secondly, a charging of the combustion chamber can be improved. The opening and closing times of the associated cylinder can also be aligned with the position of the adjustment device for the swirl generator. The use of the swirl generator is particularly advantageous for an internal combustion engine that can be switched between the diesel and the spark engine principles. These internal combustion engines, also referred to as combined combustion engines, CCS, or an associated method, homogeneous charge compression ignition, abbreviated HCCI, can advantageously be used with such a swirl generation, preferably in coordination with the scavenging at a desired set valve overlap for the respective method principle to be used.

The swirl generator can preferably also be used to be able to support a homogenization during the intake stroke with simultaneously injected fuel. Such a homogenized injection method with multiple injection, preferably exclusively during the intake stroke, follows from DE 10 2006 030 213, herewith incorporated within the scope of the present disclosure by reference. The combustion method presented therein, particularly the homogenization, can be employed in an internal combustion engine with a variable valve train controlled by cams, for example, as disclosed in PCT-/EP 2007/007385, as yet unpublished. This publication is herewith incorporated in full into the present disclosure by reference, particularly in relation to the method found there for switching from the diesel to the spark-ignition principle, wherein the swirl generator can preferably be employed to couple an adaptation of the valve timing and thus an overlap of the intake and exhaust valve to a corresponding creation of the swirl and thus an air charge and/or scavenging of the combustion chamber.

A combination of an adjustable suitable valve overlap, which goes hand-in-hand with variable valve timings, with an initial swirl for the compressor has the result that, especially in the so-called turbo hole in an acceleration of a vehicle, the valve overlap for a charge pressure increased by swirling provides a better scavenging of the cylinders of an associated internal combustion engine.

According to a refinement, a method for operating a supercharged internal combustion engine of a motor vehicle comprises an adjustable swirl generator upstream of a supercharger for scavenging a combustion chamber of a cylinder in the internal combustion engine. The adjustment is adapted to the scavenging of the combustion chamber, particularly to an adjustable suitable valve overlap of intake and exhaust valves. For this purpose it is possible to use the above-described features with respect to the described motor vehicle drive.

For example, it is provided that a valve overlap is matched to the swirl produced by the swirl generator. It is preferably provided that a swirl application is increased immediately before a valve overlap at the cylinder. It can also be provided, for an internal exhaust gas recirculation, for example, i.e. a brief opening and closing of an exhaust valve for combusted gas to flow back into the combustion chamber, that a corresponding swirl application by the swirl generator is reduced and thus a pressure increase either becomes lower or is avoided. Another configuration provides that there is an external exhaust gas recirculation and a swirl increase in the acceleration phase of the internal combustion engine, for example, or during a different operating phase, with the duration of the valve overlap being reduced. Another configuration provides that the swirl generator automatically adjusts as a function of the intake air volume flow and applies a higher or lower swirl. Such a device and such a method are known from WO 2007/1350891 for example, which was already incorporated by reference above. In this respect, that publication is incorporated in full by reference. Another refinement provides that the swirl generator can adjust itself automatically only in part. This adjustment can comprise a positioning by the actuator into a first rough position, while a fine positioning takes place automatically. The automatic adjustment of the swirl generator can additionally or separately comprise the swirl generator being able to position itself independently in one operating range, while it is specifically positioned via an actuator of the adjusting device over a different part of the operating range of the internal combustion engine. This can be accomplished by means of a lockable freewheel, for example. In another configuration, it is provided that the swirl generator can only undergo a change of position and thus a change of the applied swirl under external control. A usage of a swirl generator coupled to a supercharger for improving a scavenging of a combusted fuel-air mixture from a cylinder of an internal combustion engine during a valve overlap of intake and exhaust valve of the cylinder is preferred.

BRIEF DESCRIPTION OF THE DRAWINGS

Further advantages and configurations will be illustrated based on the following figures. The characteristics that can be seen there are not to be understood as limited to the individual configurations, however. They are used instead for illustrative purposes and are not to be interpreted restrictively. The characteristics can be combined with other characteristics from the above description as well as from other figures into additional embodiments, which will not be presented in detail, however.

Therein.

DETAILED DESCRIPTION OF THE INVENTION

Figure 1:
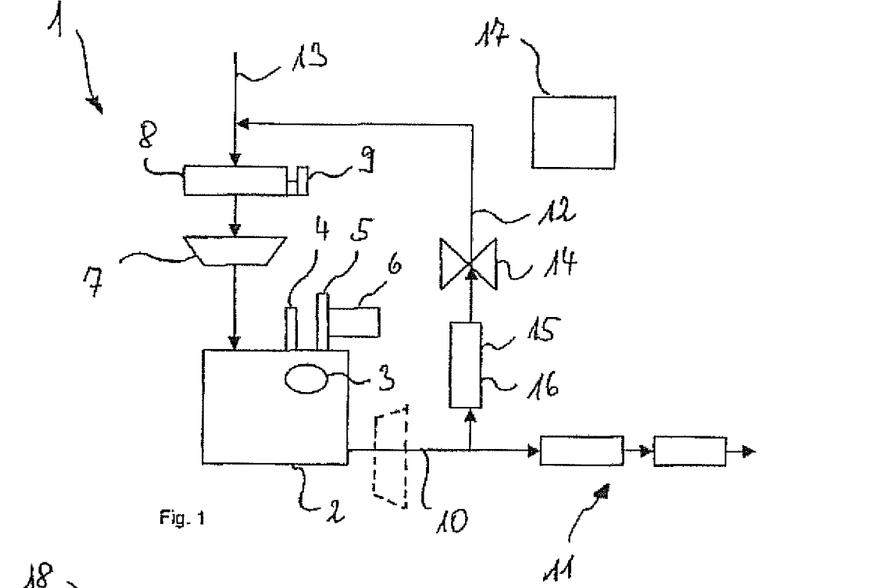
FIG. 1 shows a first example schematic representation of a drive.

FIG. 1 shows a first drive 1 in a schematic representation. The first drive 1 comprises an internal combustion engine 2, which is likewise only shown schematically, with a combustion chamber 3, an intake valve 4 and exhaust valve 5 as well as a control element for the valve train 6. The figure schematically shows only the intake and exhaust valves 4, 5. At least one intake and one exhaust valve 4, 5 can be assigned to each cylinder. At least two intake and two exhaust valves are preferred, however. They can be actuated individually via the actuator 6 or in groups via a corresponding cam device. The internal combustion engine 2 is connected on the intake side to a first compressor 7. The first compressor 7 can be an electrically driven compressor or a mechanically driven compressor. According to the illustrated configuration, the first compressor 7 is not coupled to an exhaust gas turbine. Instead, the energy for driving the compressor is provided exclusively via a mechanical or electrical coupling. This has the special advantage that the first compressor 7 can be actuated even in a low engine speed range in which the compressor might not have sufficient energy for rapid load requirements if driven via a turbine in the exhaust tract. The connection of the compressor to an exhaust gas turbine is indicated as an alternative. The exhaust gas turbine is shown with a dashed line. The first compressor 7 can alternatively be operated by the turbine and/or an electrical or mechanical drive. A first swirl generator 8 with a control member 9 is arranged upstream of the first compressor 7. The swirl generator 8 can modify an inflow to the first compressor 7 in such a manner that a swirl is applied to the flow. This swirl is preferably a flow direction component that is inserted into the intake flow and preferably runs rotationally symmetrically about an axis of the swirl generator 8. The positioning of the swirl generator 8 can be influenced by means of an actuator element 9 in such a manner that a different swirl application becomes possible. In addition, a different flow can also be applied to the downstream compressor 7 by a corresponding construction of the swirl generator 8, in particular, in coordination with the rotor blade geometry of the compressor rotor blades in the first compressor 7. The first compressor 7 can preferably have adjustable guide vanes and/or rotor blades. The swirl generator 8 preferably has adjustment possibilities adapted thereto so that is possible for the swirl generator 8 to apply an initial swirl matched to the mass flow passing through the compressor and the rotational speed of the compressor. The swirl generator 8 can preferably not merely apply a swirl to the flow. The swirl generator can also variably block the cross-section of the pipe. In this manner the swirl generator simultaneously serves as a throttle or channels the flow in such a manner that, in accordance with one configuration, the swirl is applied to the entire flow or at least the greatest portion thereof.

An improved compression in the first compressor 7 is preferably produced by the swirl generator 8. In addition, another configuration makes it possible for the applied swirl, particularly if amplified by the compressor, to be propagated into the internal combustion engine 2 and to contribute there to improved scavenging during a valve overlap of intake and exhaust valves 4, 5. The fact that an increased compression in the first compressor is made possible due to the swirl generation likewise contributes to the improved scavenging. Thereby a higher clearance gradient can be built up. This pressure buildup, particularly in a lower speed range, is capable of compensating for an exhaust gas turbine hole that may otherwise be present in the torque curve. The gas flowing out of the internal combustion engine 2 is supplied by the internal combustion engine 2 at least in part to an exhaust gas cleaning system 11 via an exhaust tract 10 and, depending on the type of internal combustion engine 2, the exhaust cleaning system 11 can comprise a 3-way catalytic converter, a $NO_x$ storage catalytic converter, an HC trap, a particle filter and/or some other device influencing the exhaust gas, such as a urea injection unit. An external exhaust gas recirculation line 12 leads from the exhaust tract 10 back to an intake tract 13 of the drive 1. The supplied exhaust gas stream can be controlled, and in particular also regulated, via a switchable valve 14 in the intake tract 13. An exhaust gas cooler 15 and/or an exhaust gas cleaning system 16 can also be arranged in the external exhaust gas recirculation line 12. The latter can also be integrated into one component, as shown. The individual components are all subordinated to a control device 17, such as an electronic engine control device. The electronic engine control device is connected to the individual components to be controlled either directly or via control devices to which the individual components are subordinate. The same applies to sensors such as mass flow sensors, temperature sensors, speed sensors, pressure sensors, lambda sensors or other sensors that are arranged in the intake tract 13 and/or the exhaust tract 10.

Figure 2:
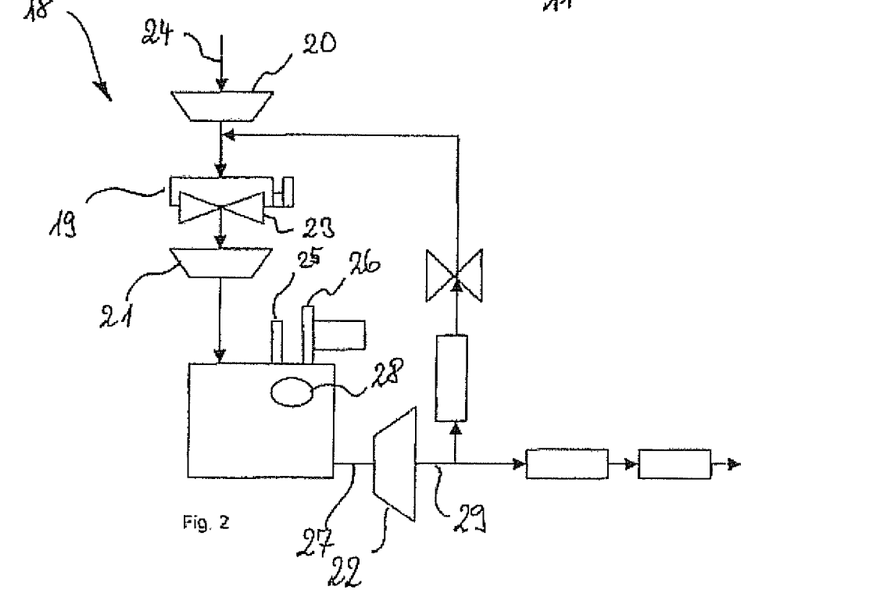
FIG. 2 shows a second example schematic representation of a drive.

FIG. 2 shows a second example configuration of a second drive 18 of a motor vehicle. The swirl generator 19 in this case is arranged between a second compressor 20 and a third compressor 21. The third compressor 21 is connected to a turbine 22, via which the compressor is driven. The second compressor 20, on the other hand, is preferably driven electrically or mechanically but can likewise be coupled to a turbine according to a different configuration. The swirl generator 19 also comprises a device for throttling the mass flow integrated alongside the device for generating a swirl. This device 23 is indicated schematically. The precise structure of such a swirl generator 19 can be found, for example, in the above-mentioned prior art, which is herein incorporated into the scope of the disclosure by reference with respect to the structure of different swirl generators. Therefore these documents are referenced within the disclosure. A first supercharging in the intake tract 24 is implemented by the second compressor 20. Via the swirl generator 19 and the integrated device 23, the swirl can be applied and the mass flow by means of the second compressor 20 can also be throttled. The throttling makes it possible for a speed increase to take place in the remaining cross section. An additional swirl application can also be effected. With an appropriate design of the flow from the swirl generator 19 to the third compressor 21, a preferred pressure increase can be achieved by the third compressor 21. In addition, there is the possibility that the compressor as well as the turbine 22 coupled to it can respond more quickly to a load demand. It is therefore possible that the intake and exhaust valves 25, 26, in combination with the swirl application, can be switched in such a manner that the valve overlap during a charge exchange is structured so that a lean exhaust is present in the exhaust tract 27 relative to a lambda in the combustion chamber 28. the regulator of the exhaust gas recirculation can also be connected to the exhaust tract 29, as is found for example in PCT/EP2007/003686 by the applicant, which is herewith incorporated in full within the scope of the present invention by reference.

Figure 3:
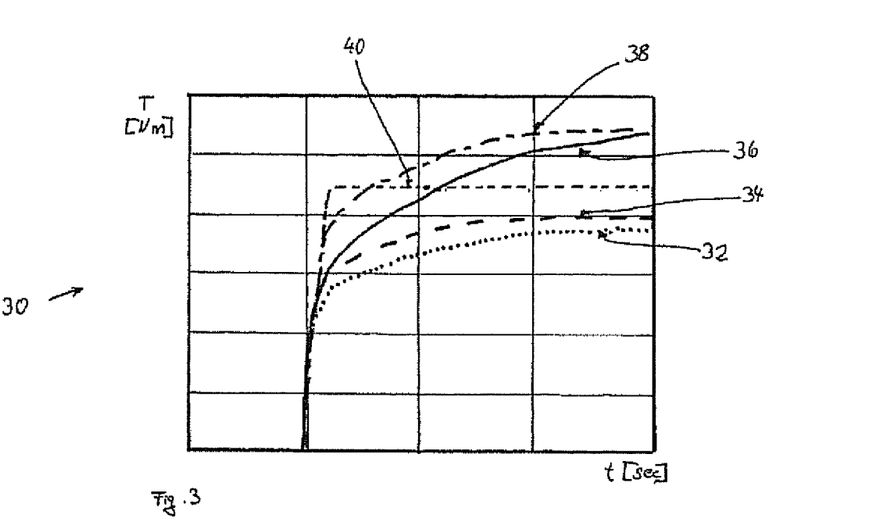
FIG. 3 shows a graphical illustration of different curves of torque over time.

FIG. 3 presents a graphic 30 which shows various torque curves resulting from internal combustion engines with identical power operating on the four-stroke principle. All the torque curves have in common the fact that they comprise a linearly increasing range that, with the exception of one curve, transitions into a progressively increasing range. A torque curve 32 of a supercharged first internal combustion engine operating on the diesel principle represents the lowest achieved torque level in the graphic 30. Compared to the latter, a torque increase can be noted in a torque curve 34 of a second internal combustion engine operating on the diesel principle, in which a swirl is generated upstream of the compressor. A further increase of torque can be noted in a torque curve 36 of a third internal combustion engine operating according to the diesel principle, in which variable valve timings that lead to variable valve overlaps are used in place of the swirl upstream of the compressor. A further increase of torque development is noted in a torque curve 38 of a fourth internal combustion engine operating on the diesel principle, since variable suitable valve overlaps accompanying variable valve timings and a generation according to the invention of a swirl upstream of the compressor are used in this internal combustion engine. Also shown in the graphic 30 is a torque curve 40 of an internal combustion engine with equal power operating on the spark-ignition principle, whose linearly increasing torque range transitions into a torque plateau This internal combustion engine briefly achieves a higher torque level than the above-described curves 36, 38, but its torque plateau a short time later is lower than the latter.

Figure 4:
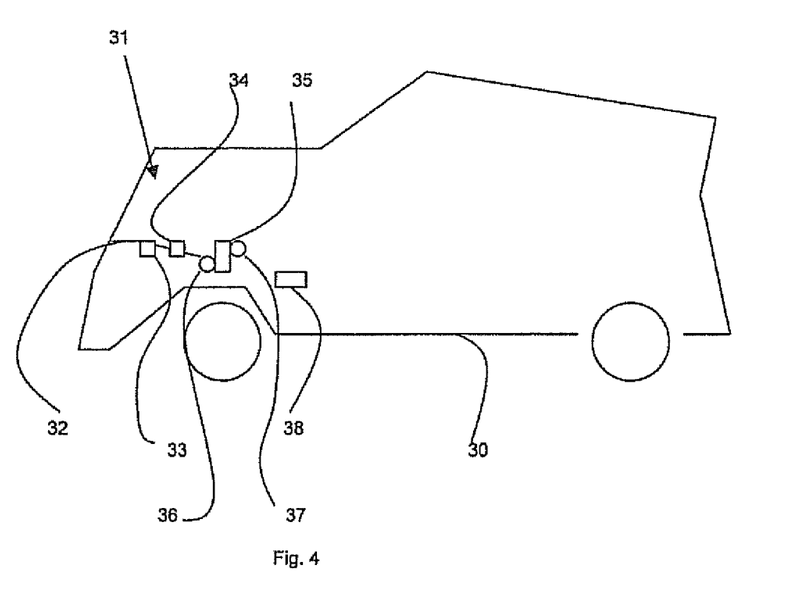
FIG. 4 shows an additional schematic view of an internal combustion engine.

FIG. 4 shows an example schematic view of a vehicle 30 with a vehicle drive 31, wherein the vehicle drive 31 is shown greatly simplified. An air path 32 has a first device 33 and a second device 34. The first device 33 can be a throttle valve, for example, and the second device 34 can be a swirl generator with supercharging. There is likewise the possibility for the first device 33 to be a swirl generator with supercharging while the second device 34 is a throttle valve. A cylinder 35 can therefore be filled and scavenged by means of a variable valve train, wherein at least one associated intake valve 36 and exhaust valve 37 are at least controlled, preferably regulated by a control device 38 with respect to their opening and closing times as well as their respective stroke. The control device 38 can be an electronic engine control device. It can also be an independent additional control device 38, however, which can be used redundantly to the electronic engine control device. According to one refinement of the invention, the engine control of the vehicle drive 31 can do without a throttle valve. In this case, for example, the first device 33 is a first charging stage and the second device 34 is a second charging stage that also comprises a swirl generator. By means of the variable valve train and with the assistance of the swirl generator, the load can be regulated in this case via the supercharging.

The invention claimed is:

1. A method of operating a supercharged internal combustion engine for a vehicle, comprising the steps of:
providing an adjustable swirl generator being arranged upstream of a supercharging unit, the adjustable swirl generator adjusted for applying an angular momentum to the supercharging unit so as to increase a speed of a charging pressure build-up of the supercharged internal combustion engine;
adjusting an air/volumetric flow current using the adjustable swirl generator; and
correlating an adjustment of a variable valve train of the supercharged internal combustion engine with an adjustment of the adjustable swirl generator such that a valve overlap that scavenges a combustion chamber of a cylinder of the supercharged internal combustion engine is produced.

2. The method according to claim 1, further comprising the step:
adjusting the adjustable swirl generator to adapt to a scavenging process of the cylinder.

3. The method according to claim 1, further comprising the step:
influencing a charging of the cylinder by an adjustment of the adjustable swirl generator and the valve overlap as a function of one another.

4. The method according to claim 1, further comprising the step:
producing a higher charge pressure for the supercharging by an adjustment of the adjustable swirl generator; and
increasing a speed of the scavenging in the cylinder due to an adapted adjustment of the valve overlap.

5. The method according to claim 1, further comprising the step:
controlling a load of the supercharged internal combustion engine via the adjustable swirl generator.

6. The method according to claim 5, further comprising the step:
controlling the load exclusively via the adjustable swirl generator.

7. The method according to claim 1, wherein the method takes place at least in an operating range of the supercharged internal combustion engine close to full load.

8. The method according to claim 1, wherein the method reduces a knock sensitivity of the supercharged internal combustion engine.

9. The method according to claim 1, further comprising the step: carrying out a multi-stage supercharging of the supercharged internal combustion engine via an upstream supercharging stage and a downstream supercharging stage; and
effecting an acceleration of a response behavior of the downstream supercharging stage via the adjustable swirl generator, the adjustable swirl generator arranged between the upstream supercharging stage and the downstream supercharging stage.

10. A vehicle drive device comprising:
an internal combustion engine;
a supercharging unit that supercharges the internal combustion engine such that the internal combustion engine is a supercharged internal combustion engine;
an adjustable variable valve train that adjusts at least one of an intake valve and an exhaust valve of the supercharged internal combustion engine;
an adjustable swirl generator positioned upstream of the supercharging unit, the adjustable swirl generator adjusts an angular momentum of an air/volumetric flow prior to entering the supercharging unit; and
an electronic engine control device connected to the adjustable swirl generator and the adjustable variable valve train, the electronic engine control device having an implemented correlation stored therein, the electronic engine control device configured to implement the correlation to correlate an adjustment of the adjustable variable valve train with an adjustment of the adjustable swirl generator such that a valve overlap for scavenging a combustion chamber of a cylinder of the supercharged internal combustion engine is produced;
wherein the implemented correlation in the electronic engine control device takes into account the adjustment of the adjustable variable valve train and the adjustment of the adjustable swirl generator including the angular momentum to be applied to the supercharging unit so as to increase a speed of charging pressure build-up of the supercharged internal combustion engine.

11. The vehicle drive device according to claim 10, wherein the electronic engine control device is configured to use the adjustable swirl generator to adjust the air/volumetric flow.

12. The vehicle drive device according to claim 10, wherein the electronic engine control device is configured to use the adjustable swirl generator to control a load of the supercharged internal combustion engine.

13. The vehicle drive device according to claim 10, wherein the supercharged internal combustion engine is not equipped with an associated throttle valve, wherein the electronic engine control device is configured to adjust the adjustable swirl generator to control an air/volumetric flow into a combustion chamber of a cylinder in the supercharged internal combustion engine.

14. The vehicle drive device according to claim 10, wherein a throttle valve is arranged upstream of the adjustable swirl generator as viewed in a flow direction.

15. The vehicle drive device according to claim 10, wherein a throttle valve is arranged downstream of the supercharging unit as viewed in a flow direction.

16. The vehicle drive device according to claim 10, wherein the supercharging unit is a staged supercharging unit, the staged supercharging unit having at least two supercharging stages.

17. The vehicle drive device according to claim 16, wherein the adjustable swirl generator is arranged at least between the two supercharging stages.

18. The vehicle drive device according to claim 10, wherein a pressure sensor is assigned to an intake pipe of the supercharged internal combustion engine and the pressure sensor is connected to the electronic engine control device, wherein the electronic engine control device has a stored adjustment of a valve opening and a valve closing as a function of the measurement signal from the pressure sensor.

19. The vehicle drive device according to claim 10 wherein the adjustable swirl generator is adjustable to apply a swirl in a rotational direction of a compressor device in the supercharging unit to a flow, as well as being adjustable to apply a swirl opposite to a rotational direction of a compression unit during supercharging of the supercharged internal combustion engine.

20. The vehicle drive device according to claim 10, wherein an energy generated as an angular momentum by the adjustable swirl generator is applied to the supercharging unit, such that the energy can be converted to a higher rotational speed of the supercharging unit.

* * * * *